H. E. ROBINSON.
FASTENER.
APPLICATION FILED APR. 8, 1912.

1,037,991.

Patented Sept. 10, 1912.

WITNESSES.
Joseph R. Hyn
Frances M. Corbin

INVENTOR.
Herbert E. Robinson
BY Horatio E. Bellows
ATT'Y.

UNITED STATES PATENT OFFICE.

HERBERT E. ROBINSON, OF PROVIDENCE, RHODE ISLAND.

FASTENER.

1,037,991.  Specification of Letters Patent.  Patented Sept. 10, 1912.

Application filed April 8, 1912. Serial No. 689,307.

*To all whom it may concern:*

Be it known that I, HERBERT E. ROBINSON, a citizen of the United States, residing at Providence, in the county of Providence and State of Rhode Island, have invented certain new and useful Improvements in Fasteners, of which the following is a specification.

My invention relates to fasteners for chains, necklaces, and similar articles of jewelry, and has for its essential objects simplicity, inexpensiveness, facility of operation, and neatness of appearance.

To the above ends my invention consists in such parts and combinations of parts as fall within the scope of the appended claim.

Figure 1:
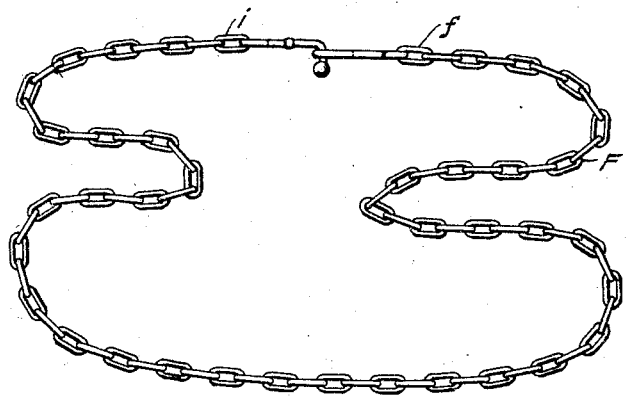
Figure 2:
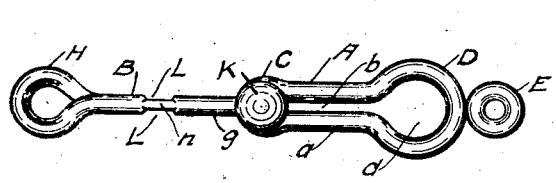
Figure 4:
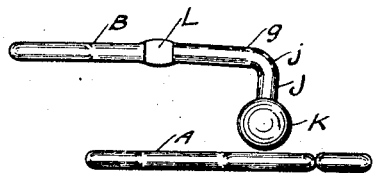
Figure 3:
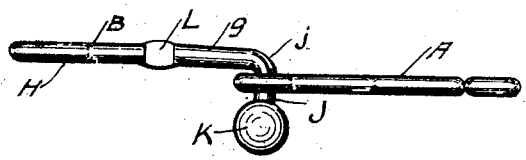
Figure 5:
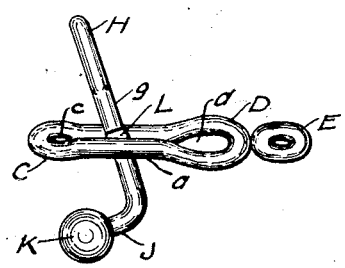

In the accompanying drawings which form a part of this specification, wherein like characters of reference indicate like parts throughout the views, Figure 1 is a side elevation of my fastener in engaged position and attached to a chain, Figs. 2 and 3, a bottom plan view and a side elevation respectively of my fastener in engagement, Fig. 4 a side elevation of the fastener parts detached, and Fig. 5, a perspective view of the fastener parts in partially engaged position.

In the accompanying drawings, A indicates a receiving member and B an engaging member of my complete fastener. The receiving or engaged member A is constructed preferably of wire and comprises an oblong body consisting of an intermediate reduced portion $a$ formed by two parallel wire legs forming a resultant slot or passage $b$. Continuous with one end of the intermediate or body portion $a$ is a small loop C forming an opening $c$ continuous with the passage $b$ but of greater dimensions. Continuous with the opposite end of the portion $a$ is a loop D forming an opening $d$ of greater diameter than the opening $c$. Integral with or fixed to the loop D is a ring or eye E adapted to receive the end link $f$ of a chain or flexible member F with which the fastener is intended to be used.

The member B comprises a rod $g$ provided upon its outer end with an integral loop H adapted to receive the opposite end link $i$ of the flexible member F. The opposite end of the rod $g$ is bent, as at $j$, to form a finger J disposed at substantially right angles to the rod $g$. The finger J terminates in a spherical member or ball K. At a point intermediate its length the rod $g$ has its opposite sides compressed to create opposite cavities L forming a reduced portion $n$.

My fastener is operated as follows: The members A and B are positioned relatively to each other as indicated in Fig. 4 with the ball K immediately over the larger opening $d$ in the member B, which opening is of sufficient dimensions to readily permit the passage of the ball K therethrough. The ball is then downwardly passed through the opening $d$ until the reduced portion $n$ of the rod $g$ comes into the horizontal plane of the body $a$, whereupon the portion $n$ is slid through the passage $b$, the rod $g$ being for this purpose held at substantially right angles to the member B. When the rod $g$ has reached the opening $c$, the rod is brought into a horizontal position with the finger J engaging the end of the loop C while the parts are held in engagement, since the opening $c$ is of less dimensions than the opening $d$ and of less dimension than the ball K, so that the ball cannot escape upwardly through the opening $c$. The diameter of the rod $g$ being in excess of the width of the slot or passage $b$, the member B cannot under normal conditions escape by any horizontal movement from the member A. The disengagement can obviously only take place by tilting the member B inwardly at substantially right angles to the member A and reversing the described operations.

What I claim is,

In a fastener, the combination of a receiving member comprising an oblong body having at one end a small loop with opening and at the other end a larger loop and opening, with an intermediate longitudinal connecting slot, and an engaging member comprising a rod having upon one end an integral loop and the other end bent at substantially right angles and provided with a knob, said rod intermediate its length having upon its opposite sides cavities forming a reduced portion of substantially the same diameter as the width of said slot, said rod and its bent portion being of greater diameter than said slot and of less diameter than said smaller loop, said knob being sufficiently small to pass through the larger opening of the receiving member and of too great dimensions to pass through the smaller opening thereof.

In testimony whereof I have affixed my signature in presence of two witnesses.

HERBERT E. ROBINSON.

Witnesses:
FRANK STEERE,
HORATIO E. BELLOWS.